(12) United States Patent
Sadot

(10) Patent No.: US 7,974,388 B2
(45) Date of Patent: Jul. 5, 2011

(54) ADVANCED PORT-BASED E911 STRATEGY FOR IP TELEPHONY

(75) Inventor: Emek Sadot, Givataiim (IL)

(73) Assignee: Avaya Inc., Basking Ridge, NJ (US)

( * ) Notice: Subject to any disclaimer, the term of this patent is extended or adjusted under 35 U.S.C. 154(b) by 1380 days.

(21) Appl. No.: 11/326,702

(22) Filed: Jan. 6, 2006

(65) Prior Publication Data

US 2006/0120517 A1    Jun. 8, 2006

Related U.S. Application Data

(63) Continuation of application No. 10/795,119, filed on Mar. 5, 2004, now Pat. No. 7,130,385.

(51) Int. Cl.
*H04M 11/00* (2006.01)
(52) U.S. Cl. ............................................ 379/45; 379/37
(58) Field of Classification Search .................... 379/45, 379/37, 90.01; 370/352
See application file for complete search history.

(56) References Cited

U.S. PATENT DOCUMENTS

| | | | |
|---|---|---|---|
| 515,426 | A | 2/1894 | French et al. |
| 4,035,760 | A | 7/1977 | Asbury et al. |
| 4,074,069 | A | 2/1978 | Tokura et al. |
| 4,275,385 | A | 6/1981 | White |
| 4,446,454 | A | 5/1984 | Pyle |
| 4,932,050 | A | 6/1990 | Davidson et al. |
| 5,206,903 | A | 4/1993 | Kohler et al. |
| 5,208,864 | A | 5/1993 | Kaneda |
| 5,315,434 | A | 5/1994 | Mizuno et al. |
| 5,461,390 | A | 10/1995 | Hoshen |
| 5,515,426 | A | 5/1996 | Yacenda et al. |
| 5,519,669 | A | 5/1996 | Ross et al. |
| 5,543,778 | A | 8/1996 | Stouffer |
| 5,550,547 | A | 8/1996 | Chan et al. |
| 5,555,376 | A | 9/1996 | Theimer et al. |
| 5,558,013 | A | 9/1996 | Blackstone, Jr. |
| 5,627,375 | A | 5/1997 | Hsieh |

(Continued)

FOREIGN PATENT DOCUMENTS

CN           1141567          1/1997

(Continued)

OTHER PUBLICATIONS

Cisco Systems, Inc., *Cisco Emergency Responder Version 1.1* (Oct. 2001), 5 pages.

(Continued)

*Primary Examiner* — Stella L Woo
(74) *Attorney, Agent, or Firm* — Sheridan Ross P.C.

(57) ABSTRACT

An enterprise network includes at least one communication device 208-1, an Open Systems Interconnect (OSI) Layer 2 switch 206, and a corresponding enterprise switch 208. The communication device 208-1 is connected to at least one of an access point 904-1 and a respective port 207-1 of the Layer 2 switch 206. The enterprise network includes a plurality of Emergency Location Information Numbers (ELINs) corresponding to differing segments of the enterprise network. The Layer 2 switch 206 serves at least one of the differing segments. The communication device 208-1 includes a discovery agent 252 operable, when a predetermined first event occurs, to obtain from the Layer 2 switch 206 at least one of an access point identifier, a switch identifier from the Layer 2 switch 206, and a port identifier identifying the respective port 207-1.

26 Claims, 6 Drawing Sheets

U.S. PATENT DOCUMENTS

| | | |
|---|---|---|
| 5,680,450 A | 10/1997 | Dent et al. |
| 5,689,548 A | 11/1997 | Maupin et al. |
| 5,742,666 A | 4/1998 | Alpert |
| 5,748,083 A | 5/1998 | Rietkerk |
| 5,793,861 A | 8/1998 | Haigh |
| 5,805,999 A | 9/1998 | Inoue |
| 5,828,626 A | 10/1998 | Castile et al. |
| 5,828,747 A | 10/1998 | Fisher et al. |
| 5,884,262 A | 3/1999 | Wise et al. |
| 5,905,659 A | 5/1999 | Rose |
| 5,905,793 A | 5/1999 | Flockhart et al. |
| 5,960,061 A | 9/1999 | Fahie et al. |
| 5,982,873 A | 11/1999 | Flockhart et al. |
| 6,046,683 A | 4/2000 | Pidwerbetsky et al. |
| 6,067,017 A | 5/2000 | Stewart et al. |
| 6,069,570 A | 5/2000 | Herring |
| 6,076,121 A | 6/2000 | Levine |
| 6,100,806 A | 8/2000 | Gaukel |
| 6,104,288 A | 8/2000 | Hopkins |
| 6,104,711 A | 8/2000 | Voit |
| 6,154,525 A | 11/2000 | Formosa |
| 6,173,053 B1 | 1/2001 | Bogart et al. |
| 6,192,122 B1 | 2/2001 | Flockhart et al. |
| 6,236,313 B1 | 5/2001 | Eskildsen et al. |
| 6,236,365 B1 | 5/2001 | LeBlanc et al. |
| 6,249,227 B1 | 6/2001 | Brady et al. |
| 6,265,963 B1 | 7/2001 | Wood, Jr. |
| 6,275,794 B1 | 8/2001 | Benyassine et al. |
| 6,282,574 B1 | 8/2001 | Voit |
| 6,310,549 B1 | 10/2001 | Loftin et al. |
| 6,359,880 B1 | 3/2002 | Curry et al. |
| 6,362,778 B2 | 3/2002 | Neher |
| 6,377,203 B1 | 4/2002 | Doany |
| 6,400,265 B1 | 6/2002 | Saylor et al. |
| 6,449,358 B1 | 9/2002 | Anisimov et al. |
| 6,453,291 B1 | 9/2002 | Ashley |
| 6,456,964 B2 | 9/2002 | Manjunath et al. |
| 6,463,607 B2 | 10/2002 | Hartmann |
| 6,486,780 B1 | 11/2002 | Garber et al. |
| 6,496,806 B1 | 12/2002 | Horwitz et al. |
| 6,504,838 B1 | 1/2003 | Kwan |
| 6,505,780 B1 | 1/2003 | Yassin et al. |
| 6,542,436 B1 | 4/2003 | Myllyla |
| 6,559,620 B2 | 5/2003 | Zhou et al. |
| 6,580,908 B1 | 6/2003 | Kroll et al. |
| 6,600,443 B2 | 7/2003 | Landt |
| 6,650,901 B1 | 11/2003 | Schuster et al. |
| 6,661,340 B1 | 12/2003 | Saylor et al. |
| 6,678,357 B2 | 1/2004 | Stumer et al. |
| 6,687,609 B2 | 2/2004 | Hsiao et al. |
| 6,687,668 B2 | 2/2004 | Kim et al. |
| 6,694,787 B1 | 2/2004 | Brown |
| 6,705,522 B2 | 3/2004 | Gershman et al. |
| 6,707,383 B2 | 3/2004 | Flaherty |
| 6,707,903 B2 | 3/2004 | Burok et al. |
| 6,757,359 B2 | 6/2004 | Stumer et al. |
| 6,759,957 B2 | 7/2004 | Murakami et al. |
| 6,763,231 B2 | 7/2004 | Takatori et al. |
| 6,778,084 B2 | 8/2004 | Chang et al. |
| 6,778,096 B1 | 8/2004 | Ward et al. |
| 6,804,329 B2 | 10/2004 | Geck et al. |
| 6,825,767 B2 | 11/2004 | Humbard |
| 6,847,892 B2 | 1/2005 | Zhou et al. |
| 6,892,052 B2 | 5/2005 | Kotola et al. |
| 6,898,434 B2 | 5/2005 | Pradhan et al. |
| 6,901,255 B2 | 5/2005 | Shostak |
| 6,907,238 B2 | 6/2005 | Leung |
| 6,965,313 B1 | 11/2005 | Saylor et al. |
| 6,972,682 B2 | 12/2005 | Lareau et al. |
| 6,983,124 B1 | 1/2006 | Bayley et al. |
| 6,989,750 B2 | 1/2006 | Shanks et al. |
| 6,990,328 B2 | 1/2006 | Crandall et al. |
| 6,996,402 B2 | 2/2006 | Logan et al. |
| 7,005,985 B1 | 2/2006 | Steeves |
| 7,015,817 B2 | 3/2006 | Copley et al. |
| 7,030,731 B2 | 4/2006 | Lastinger et al. |
| 7,030,761 B2 | 4/2006 | Bridgelall et al. |
| 7,036,729 B2 | 5/2006 | Chung |
| 7,040,532 B1 | 5/2006 | Taylor et al. |
| 7,042,359 B2 | 5/2006 | Clucas |
| 7,068,148 B2 | 6/2006 | Shanks et al. |
| 7,084,740 B2 | 8/2006 | Bridgelall |
| 7,088,242 B2 | 8/2006 | Aupperle et al. |
| 7,113,090 B1 | 9/2006 | Saylor et al. |
| 7,123,149 B2 | 10/2006 | Nowak et al. |
| 7,126,470 B2 | 10/2006 | Clift et al. |
| 7,130,385 B1 | 10/2006 | Moon |
| 7,135,977 B2 | 11/2006 | Burg et al. |
| 7,149,503 B2 | 12/2006 | Aarnio et al. |
| 7,155,238 B2 | 12/2006 | Katz |
| 7,171,004 B2 | 1/2007 | Michaelis |
| 7,183,907 B2 | 2/2007 | Simon et al. |
| 7,202,783 B2 | 4/2007 | Want et al. |
| 7,209,771 B2 | 4/2007 | Twitchell, Jr. |
| 7,212,829 B1 | 5/2007 | Lau et al. |
| 7,228,429 B2 | 6/2007 | Monroe |
| 7,257,108 B2 | 8/2007 | Cheston et al. |
| 7,262,690 B2 | 8/2007 | Heaton et al. |
| 7,266,347 B2 | 9/2007 | Gross |
| 7,274,909 B2 | 9/2007 | Perttila et al. |
| 7,280,833 B2 | 10/2007 | Suda et al. |
| 7,330,464 B2 | 2/2008 | Brouwer et al. |
| 7,333,479 B2 | 2/2008 | Jalkanen et al. |
| 7,373,109 B2 | 5/2008 | Pohja et al. |
| 7,378,956 B2 | 5/2008 | Nam et al. |
| 2002/0005894 A1 | 1/2002 | Foodman et al. |
| 2002/0103636 A1 | 8/2002 | Tucker et al. |
| 2002/0132647 A1 | 9/2002 | Chia et al. |
| 2002/0165711 A1 | 11/2002 | Boland |
| 2002/0173328 A1 | 11/2002 | Min |
| 2003/0104800 A1 | 6/2003 | Zak |
| 2003/0185402 A1 | 10/2003 | Benesty et al. |
| 2003/0227540 A1 | 12/2003 | Monroe |
| 2004/0002305 A1 | 1/2004 | Byman-Kivivuori et al. |
| 2004/0029558 A1 | 2/2004 | Liu |
| 2004/0095238 A1 | 5/2004 | Beere |
| 2004/0134984 A1 | 7/2004 | Powell et al. |
| 2004/0142678 A1 | 7/2004 | Krasner |
| 2004/0186768 A1 | 9/2004 | Wakim et al. |
| 2004/0203352 A1 | 10/2004 | Hall et al. |
| 2004/0203944 A1 | 10/2004 | Huomo et al. |
| 2005/0048988 A1 | 3/2005 | Gentle |
| 2005/0063519 A1 | 3/2005 | James |
| 2005/0083911 A1* | 4/2005 | Grabelsky et al. ............ 370/352 |
| 2005/0088299 A1 | 4/2005 | Bandy |
| 2005/0110612 A1 | 5/2005 | Carrender |
| 2005/0128295 A1 | 6/2005 | Addy |
| 2005/0207589 A1 | 9/2005 | Biegelsen |
| 2006/0028352 A1 | 2/2006 | McNamara et al. |
| 2006/0094405 A1 | 5/2006 | Dupont |
| 2006/0121916 A1 | 6/2006 | Aborn et al. |
| 2006/0158310 A1 | 7/2006 | Klatsmanyi et al. |
| 2006/0177071 A1 | 8/2006 | Eskildsen |
| 2006/0181401 A1 | 8/2006 | Martin |
| 2006/0219473 A1 | 10/2006 | Boland et al. |

FOREIGN PATENT DOCUMENTS

| | | |
|---|---|---|
| EP | 0899673 | 3/1999 |
| EP | 0998108 | 5/2000 |
| EP | 1091307 | 4/2001 |
| EP | 1150236 | 10/2001 |
| EP | 1324255 | 7/2003 |
| GB | 2298106 | 8/1996 |
| JP | H08-191311 | 7/1996 |
| JP | 2002-250768 | 9/2002 |
| JP | 2004013789 | 1/2004 |
| JP | 2004-242274 | 8/2004 |
| JP | 2004-318283 | 11/2004 |
| WO | 01/95642 | 12/2001 |
| WO | WO 01/94967 | 12/2001 |
| WO | WO 02/44865 | 6/2002 |
| WO | 2004/092999 | 10/2004 |
| WO | WO 2005001669 | 1/2005 |

OTHER PUBLICATIONS

Avaya: Communication without Boundaries, *Solving the Challenges of E911 Service with Avaya IP Telephony Networks*, White Paper, Nov. 2002, Issue 1.1, 10 pages.

Cisco Data Sheet, *Cisco Emergency Responder Version 1.1.*, Jul. 20, 2002, available at http://www.cisco.com/warp/public/cc/pd/unco/cer/prodlit/emerg_ds.htm, 7 pages.

Cisco, *Cisco Emergency Responder*, printed Feb. 11, 2003, available at http://www.cisco.com/warp/public/cc/pd/unco/cer/, 2 pages.

EIA Telecommunications Industry Association, *TIA Telecommunications Systems Bulletin: Telecommunications—IP Telephony Infrastructures—IP Telephony Support for Emergency Calling Service*, TSB-146, Mar. 2003, pp. 1-30.

RedSky Technologies, Inc.; "Welcom to RedSky's E-911 Business Watch" *E-911 Business Watch*, Issue 4 (Oct. 21, 2003), 5 pages.

U.S. Appl. No. 10/607,414, filed Jun. 25, 2003, Becker et al.

Khaled El-Maleh et al., "Comparison of Voice Activity Detection Algorithms for Wireless Personal Communications Systems," McGill University, Department of Electrical Engineering (1997), pp. 1-26.

Nikos Doukas et al., "Voice Activity Detection Using Source Separation Techniques", Signal Processing Section, Dept. of Electrical Engineering, Imperial College, UK, four (4) pages; undated.

Avaya "Administrator's Guide for Avaya Communication Manager: vols. 1, 2, and 3," 555-533-506, Issue 7 (Nov. 2003), pp. 121, 129, 886, 889, 1169, 1193, 1555.

Schulzrinne, "Providing Emergency Call Services for SIP-based Internet Telephony", Available at: http://www.iptel.org/info/players/ietf/location/draft-schulzrinne-sip-911- -00.txt, Jul. 2000, pp. 1-14.

Comments of Nortel Networks, Before the Federal Communications Commission, WC Docket No. 04-36, May 28, 2004, pp. 1-22 with Appendices 1-4.

Notice of Allowance for U.S. Appl. No. 11/369,692, mailed Dec. 16, 2009.

Active Campus Tutorial by David Casteron dated Oct. 11, 2003, downloaded from http://activecampus-dev.ucsd.edu/ntutorial/main.htm on Apr. 12, 2005.

AIM, RFID.ORG, Searching for RFID Information, available at http://www.aimglobal.org/technologies/rfid, 3 pages.

Applied Generics Technical Report "NERO24 Mobile Location System (GSM Edition)," Version 1.0 (2004), pp. 1-27.

Location Based Services downloaded from http://www.ericsson.com/telecomreport/article.asp?aid=34&tid=tid=201&ma=1&msa=3 on Apr. 12, 2005.

Mobile in a Minute downloaded from www.mobilein.com/location_based_services.htm on Apr. 12, 2005.

Newsweek, An Internet of Things—Is RFID the Mark of Satan . . . , available at http://msnbc.msn.com/id/3068871, 4 pages (Jun. 10, 2004).

Project Mayhem by Phillip Dressen, James Gillespie, Benjamin Hoyt and Simone Nicola, downloaded from http://www.cs.colorado.edu/upgrad/seniorproject/projects/projectmahhem.html on Apr. 12, 2005.

RFID Journal, Frequently Asked Questions, Manufacturing, available at http://www.rfidjournal.com/article/articleview/207, 7 pages.

RFID, Tracking Everything, Everywhere, by Katherine Albrecht, available at http://www.stoprfid.org/rfid_overview.htm, 7 pages.

RFID, Wikipedia, the free encyclopedia, available at http://en.wikipedia.org/wiki/RFID, 3 pages (Updated May 31, 2004).

The Denver Post, Bar Code Meets Its Match, Section C, (Jun. 3, 2004), p. 1C and 8C.

Time Online Edition, Global Business—The See-It-All Chip, available at http://www.time.com/time/globalbusiness/article/0,9171,1101030922-485764-3,00.html, 3 pages (Sep. 22, 2003).

Wired News, Radio ID Tags: Beyond Bar Codes, available at http://www.wired.com/news/technology/0,1282,52343,00.html, 3 pages (May 20, 2002).

WYSE, RFID, available at http://searchnetworking.techtarget.com/sDefinition/0,,sid7$_{13}$ gcl805987,00.html, 2 pages (updated Jan. 16, 2004).

U.S. Appl. No. 10/810,459, Orbach.

U.S. Appl. No. 10/932,507, filed Sep. 1, 2004, Fegan.

U.S. Appl. No. 11/369,692, filed Mar. 6, 2006, Sadot et al.

"Perimeter Security Sensor Technologies Handbook," available at http://www.nlectc.org/perimetr/full2.htm, 104 pages; printed Feb. 2, 2005.

Background of the Invention for the above-captioned application (previously provided).

Lee, "Analysis: Verizon's VoIP patents drop dime on need for reform", available at http://arstechnica.com/news.ars/post/20070425-analysis-verizons-voip-patents-drop-dime-on-need-for-reform.html, pp. 1-3, Apr. 25, 2007.

"Providing E911 services for Nortel VoIP", available at http://www.bytesnwords.com/clients/qovia/website/products/pr_overview_nortel.htm, Copyright 2004-2006 (printed Sep. 22, 2008), 1 page.

"ITU-T Recommendation G.729, Annex B: A Silence compression scheme for G.729 optimized for terminals conforming to Recommendation V.70," International Telecommunications Union, Nov. 1996, pp. 1-16.

Freeman et al., "The Voice Activity Detector For The Pan-European Digital Cellular Mobile Telephone Service," British Telecom Research Laboratories, IEEE, May 1989, CH2673-2/89/0000-0369, pp. 369-372.

Rabiner et al., Digital Processing of Speech Signals, Prentice-Hall, Englewood Cliffs, NJ, 1978, pp. 149-150.

Rangoussi et al., "Higher Order Statistics Based Gaussianity Test Applied to On-Line Speech Procesing [sic]," In Proc. of the IEEE Asilomar Conf., 1995, pp. 303-307.

Salami et al., "Speech Coding," Chapter 3 in Mobile Radio Communications, R. Steele (ed.), Pentech Press, 1992, pp. 244-253.

Srinivasan et al., "Voice Activity Detection For Cellular Networks," In Proc. IEEE Workshop on Speech Coding for Telecommunications, Oct. 1993, pp. 85-86.

Tucker, "Voice activity detection using a periodicity measure," IEE Proceedings-1, Aug. 1992, vol. 139(4), pp. 377-380.

Office Action for U.S. Appl. No. 11/369,692, mailed Jun. 9, 2009.

\* cited by examiner

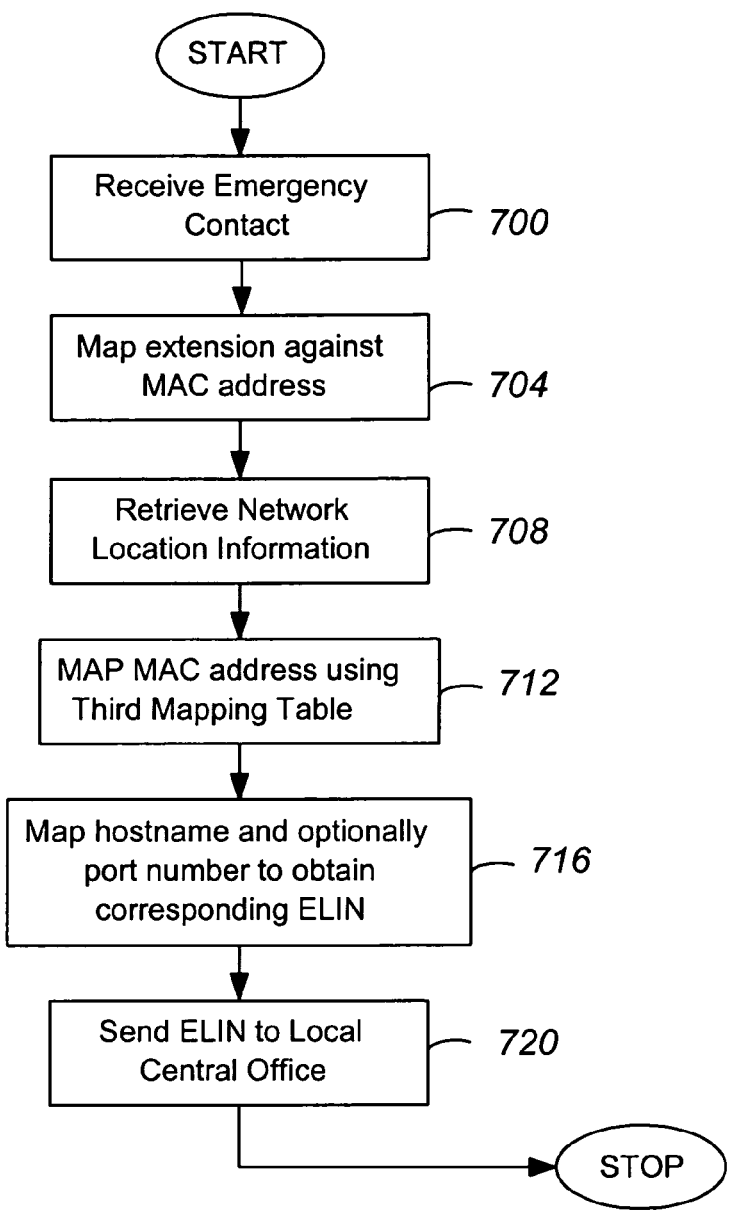

ADVANCED PORT-BASED E911 STRATEGY FOR IP TELEPHONY

FIELD OF THE INVENTION

The present invention is directed generally to emergency assistance call handling and specifically to emergency assistance call handling in a distributed processing network.

BACKGROUND OF THE INVENTION

Local regulations, as well as concerns about public safety and liability, require enterprises to provide employees and visitors with an effective means to reach a universal emergency number (e.g., 911 in the U.S., 000 in Australia, and 112 in the European Community) operator in an emergency. The call routes through the local central office, through a switch, to the appropriate Public Safety Answer Point (PSAP), where the call is answered. Each PSAP covers one city or one rural community. At the PSAP, emergency operators determine the nature of the emergency and contact the appropriate agency: typically police, fire, or emergency medical services. A single PSAP is typically responsible for an area covering several independent police and fire departments in the U.S.

With Enhanced 911 (E911), the calling party number, known as an Emergency Location Information Number (ELIN), is sent with the emergency call over Centralized Automatic Message Accounting (CAMA) trunks or via the calling number information element over Integrated Services Digital Network (ISDN) trunks. A suitably configured module at the PSAP uses the ELIN to lookup the caller's documented street address location from the Automatic Location Information (ALI) database. In ISDN, the ELIN is referred to as the location identification number.

To allow operators at the PSAP to call back a caller, IP communication systems use Public Switched Telephone Network (PSTN)-based methods to send an ELIN that identifies the telephone number for an extension from which the emergency call was dialed. If the extension number is not public, premise-based communications systems can be programmed to send an ELIN that is located nearby the calling extension. This is typically done by setting up the Local Area Network (LAN)-based telephony system itself, a media gateway, or a separate server, to automatically send a properly formatted number, such as the public telephone number. To deliver this information to the public emergency services network, the information can be encoded over analog CAMA (which requires an 8-digit ELIN), or over digital ISDN trunks (which require a 10-digit ELIN).

The above schemes assume that a calling party number or ELIN always corresponds to the street address in the ALI database. This assumption is not always true in practice. Adds, moves, and changes occur frequently in a dynamic enterprise communications environment. IP Telephony enables end users to relocate automatically their telephones to any location that can access the Wide Area Network (WAN). For example, H.323 IP telephone users can move telephones without notifying the system administrator of the move and Session Initiation Protocol (SIP) telephone users can use the same extension number at several different telephones simultaneously. If the users of such telephones dial a universal emergency number, emergency response personnel may go to the wrong physical location.

To address this problem, Cisco Systems™ has introduced the Emergency Responder™. The operation of the Emergency Responder will be discussed with reference to FIG. 1.

A communications system comprises a switch 100 (such as a Private Branch Exchange or PBX), an emergency responder 104, a first Ethernet switch 108 in a first subnet 112 and having a plurality of ports 116a-n connected to a plurality of telephones 120-1 to -N, and a second Ethernet switch 122 in a second subnet 124 and also having a plurality of ports 128a-n, all of which are connected by a network 132. As used herein, a "subnetwork" or "subnet" refers to a network segment. The telephones 120-1 to -N each have a corresponding Media Access Control or MAC address and an extension (the phone number). The Ethernet switch ports are cabled to wall jacks in specific rooms or cubicles. The switch 100 contains an auto or manual entry table with a mapping of extension to MAC address. The emergency responder 104 contains a table with a mapping of Ethernet switch and port to physical location (such as wall jack location), e.g., switch 12sw-a4 comprises port 7, which in turn corresponds to building A, floor 4, aisle C, cube 10.

The emergency responder 104, at predetermined time intervals, queries the switch 100 (or Ethernet switches directly) for new phone and user login registration events. In response to reported events, the emergency responder queries the various Ethernet switches in the network 132 using the Simple Network Management Protocol or SNMP and/or Cisco Discovery Protocol (CDP) to determine the location of the telephone and the user, based on the switch port to which the phone is attached. In other words, the responder 104 retrieves the port-to-MAC mapping information from each Ethernet switch. The location is then updated in an emergency responder location database (not shown). Thus, if telephone 120-2 is moved from port 116b of the first Ethernet switch 108 to port 128b of the second Ethernet switch 122 (as shown by the dotted lines), the emergency responder must determine that the telephone has moved and notify the switch 100. It is important to note that the switch 100 is unaware that the telephone moved from one Ethernet port to another (unless the IP address changed) because the switch 100 recognizes the telephone only by extension and MAC address. Only the Ethernet switch is aware that the telephone has moved. The responder must inform the switch 100 where the telephone is connected. To determine to which port the telephone has been moved, the responder then must query each and every Ethernet switch in the same subnetwork.

When an emergency call is placed, the switch queries the emergency responder to retrieve the calling telephone's current location based on MAC address. In response to the SNMP query, the emergency responder locates and transmits the requested information to the switch, which then forwards the information along with the call. The location is the ELIN of a real or virtual phone that has a port close to the physical location of the port of the calling phone and has a street address that is known to be correctly entered in the ALI database. When an emergency call is dropped, any calls to the ELIN are forwarded automatically for a predetermined period of time to the device originating the dropped call.

The methodology employed by the Emergency Responder™ has been embodied in TSB-146, Telecommunications-IP Telephony Infrastructures-IP Telephony Support, Emergency Calling Service, formulated under the cognizance of TIA Subcommittee TR-41.4, IP Telephony Infrastructure and Interworking Standards ("TIA Standard"). The TIA Standard requires connectivity between the IP communication device (shown in FIG. 1 as the telephones), the switch/server (called "call agent or server" in the standard and shown in FIG. 1 as the switch, an adjunct called the "Location Information Server" (shown in FIG. 1 as the emergency responder), and Simple Network Management Protocol (SNMP) ports on every data switch (shown in FIG. 1 as the first and second Ethernet switches) in the same subnet as the IP communication device.

The approach of the Emergency Responder™ and the TIA Standard can have a number of drawbacks. For example, the emergency responder, due primarily to the time required to learn of the change from the switch (due to the polling interval), is unable to collect location information on a real time basis. It is thus possible that, if a telephone is moved to another ethernet switch and dials an emergency call before the emergency responder is able to ascertain the new location of the telephone, emergency personnel will be sent to an incorrect location (which in FIG. 1 is associated with the first subnet rather than the second subnet). The likelihood of this happening depends on the duration of the polling interval of the Ethernet switches by the responder 104. As will be appreciated, switch queries are done neither too frequently as the network will be flooded with traffic nor too infrequently as a user might make an emergency call before the emergency responder recognizes the user's IP telephone has moved. Because the emergency responder 104 is queried during an emergency call for location information, there is a possibility that ELIN information may not be provided to the emergency provider, that the emergency call will be delayed until the information is received, or that an incorrect ELIN (such as a default ELIN) may be provided. Not only is there a time delay in obtaining the information, namely the switch 100 must send a query through network 132 to the responder 104 and then the responder 104 must send a response through the network 132 to the switch 100 but also the location information is not accessible if the emergency responder cannot be contacted for some reason. For example, the emergency responder or a link on a communication path to/from the responder may malfunction.

These problems are addressed by the Communication Manager 2.0™ product of Avaya Inc.™ and the Emergency Responder™ version 1.2 product of Cisco Systems™. This product locates the IP phone making the emergency call based on the phone's IP address. IP addresses are grouped into networks or sub-networks. As will be appreciated, a "subnet" is a common term used to describe a grouping of IP addresses. It is a common practice to assign a subnet of IP addresses to a relatively tight geographic region. For example, an IP subnet could be assigned to a given floor in an office building or one wing of a given floor. In this manner, an E911 caller can be located to a floor or wing of a floor based solely on the IP address of the calling phone. This methodology is discussed in copending application Ser. No. 10/607,414, filed Jun. 25, 2003, entitled "Universal Emergency Number ELIN Based on Network Address Ranges" to Becker et al., which is incorporated herein by this reference. Although this methodology represents a substantial improvement over the port-based method, it is desirable in many applications to have a more precise method of locating an E911 caller, particularly in a large building.

SUMMARY OF THE INVENTION

These and other needs are addressed by the various embodiments and configurations of the present invention. The present invention is generally directed to a system and method for providing location information associated with an emergency caller to emergency service personnel, such as police, fire, and medical personnel, by storing network-related location information in the communication device for later transmission to the servicing switch or server.

In one embodiment of the present invention, a method for providing emergency location information to an emergency service is provided. The method is employed in an enterprise network including one or more communication devices, one or more Open Systems Interconnect (OSI) Layer 2 switches, and/or one or more wireless access points and a corresponding enterprise switch. The communication device is connected to an access point or a respective port of the Layer 2 switch.

When a predetermined first event occurs, the communication device obtains the access point identifier if connected to an access point (wireless connection) or a switch identifier and possibly a port identifier if connected to a Layer 2 switch (wired connection).

When a predetermined second event occurs, the enterprise switch obtains the access point identifier or a switch identifier and port identifier from the communication device. The enterprise network corresponds to a number of Emergency Location Information Numbers (ELINs), each of which is assigned to differing segments of the enterprise network. The Layer 2 switch serves one or more of the differing segments. Each communication device typically obtains network location information only for itself and not for other communication devices. The present invention thus associates the location identification process and the intelligence associated with it to the devices directly related to call processing.

The predetermined first and second events can be the same or a different event. Typically, the events are one or more of the initiation of contact to an enterprise switch, registration or attempted registration of the communication device, connection of the communication device to the respective port, powering up of the communication device, re-establishment of a link between the communication device and the Layer 2 switch, the passage of a selected period of time, and combinations thereof The first event typically precedes the second event.

The access point identifier, switch identifier and/or port identifier can be included in one or more of an H.225 call signaling message, an H.225 Registration Admission Status or RAS message, a keep alive message, a SIP invite message, a SIP register message, and a SIP OKAY message.

When a contact to a universal emergency number is received, the method further includes the steps of:

determining an extension and Media Access Control (MAC) address corresponding to the communication device;

determining the corresponding access point identifier, switch identifier and/or port identifier;

determining an ELIN corresponding to the access point identifier, switch identifier and/or port identifier; and forwarding the ELIN to a public safety answer point. As will be appreciated, the "public safety answer point" refers typically to the location that answers a public network emergency call.

The methodology of the present invention can have a number of advantages compared to conventional systems. For example, the present invention can provide not only a substantial improvement over existing port-based methods but also can provide a more precise method of locating an E911 caller, particularly in a large building, than current IP address-based methods. The present invention requires connectivity only between the communication device and the enterprise switch (call server). This can be a reliability and traffic load advantage compared to conventional systems, such as Emergency Responder™ and the TIA Standard. The present invention can be less expensive to purchase and maintain and provide more reliability and efficiency than current port-based methods using a database server. The removal of the database server can remove problems associated with the failure of the server or failure of communication to the server. The present invention also can update a communication device's location instantly. The Emergency Responder™ and TIA standard, by contrast, update a communication device's location only after the next periodic query.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

BRIEF DESCRIPTION OF THE DRAWINGS

FIG. 7 is a flow chart of the operation of an emergency locating agent according to an embodiment of the present invention;

FIG. 8 is a third mapping table according to an embodiment of the present invention.

DETAILED DESCRIPTION

The Emergency Location System

The invention will be illustrated below in conjunction with an exemplary communication system. Although well suited for use with, e.g., a system having a private branch exchange (PBX) or other similar contact processing switch or server, the invention is not limited to use with any particular type of communication system switch or server or configuration of system elements. Those skilled in the art will recognize that the disclosed techniques may be used in any communication application in which it is desirable to provide improved caller location. The term "contact" or "call" as used herein is intended to include not only telephone calls but also non-telephonic communications, such as data transmissions such as electronic mail, voice-over-IP, instant messaging, teletypewriter (TTY), facsimile, etc., whether circuit switched or packet switched.

Figure 1:
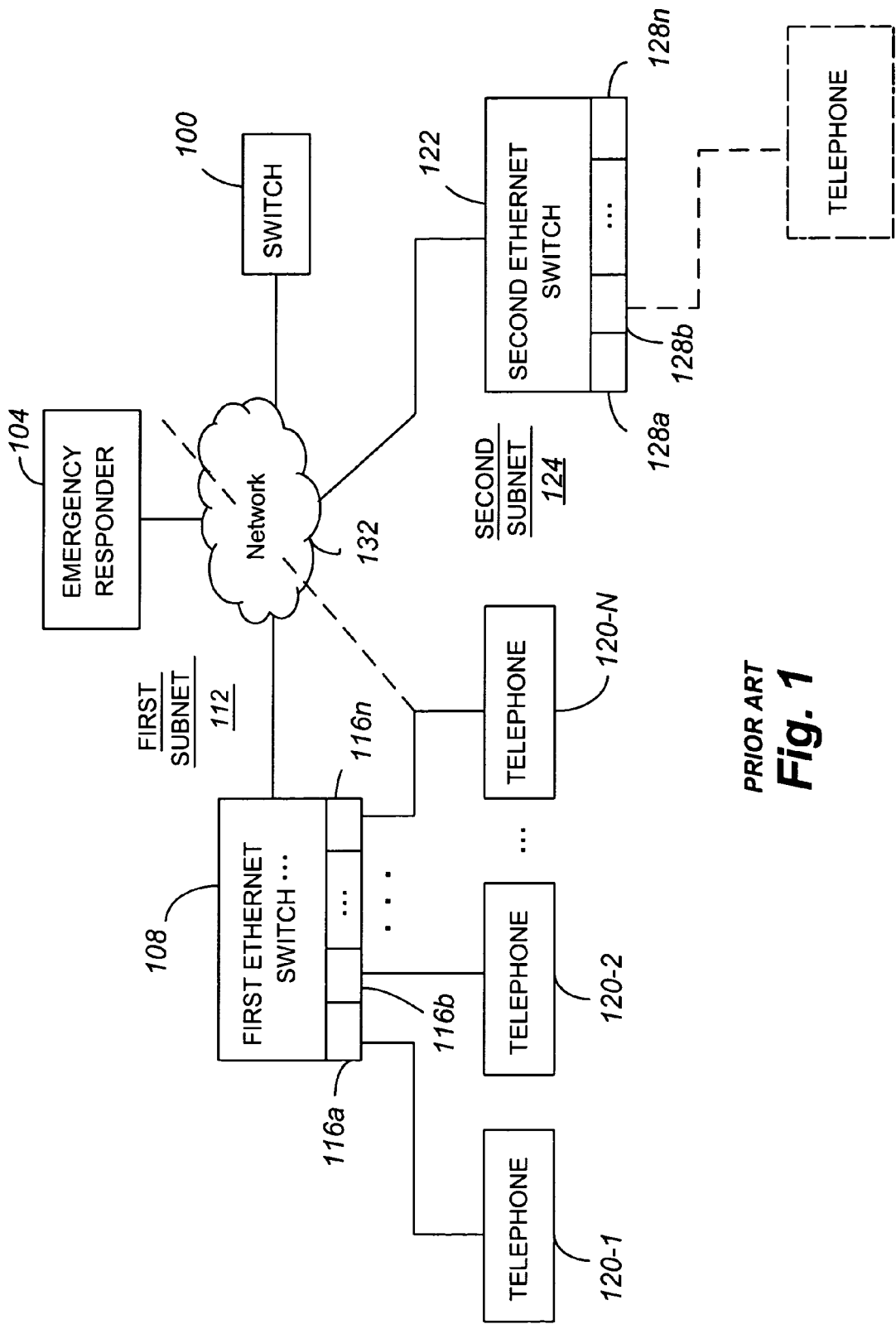
FIG. 1 is a block diagram of a prior art emergency locating infrastructure.
Figure 2:
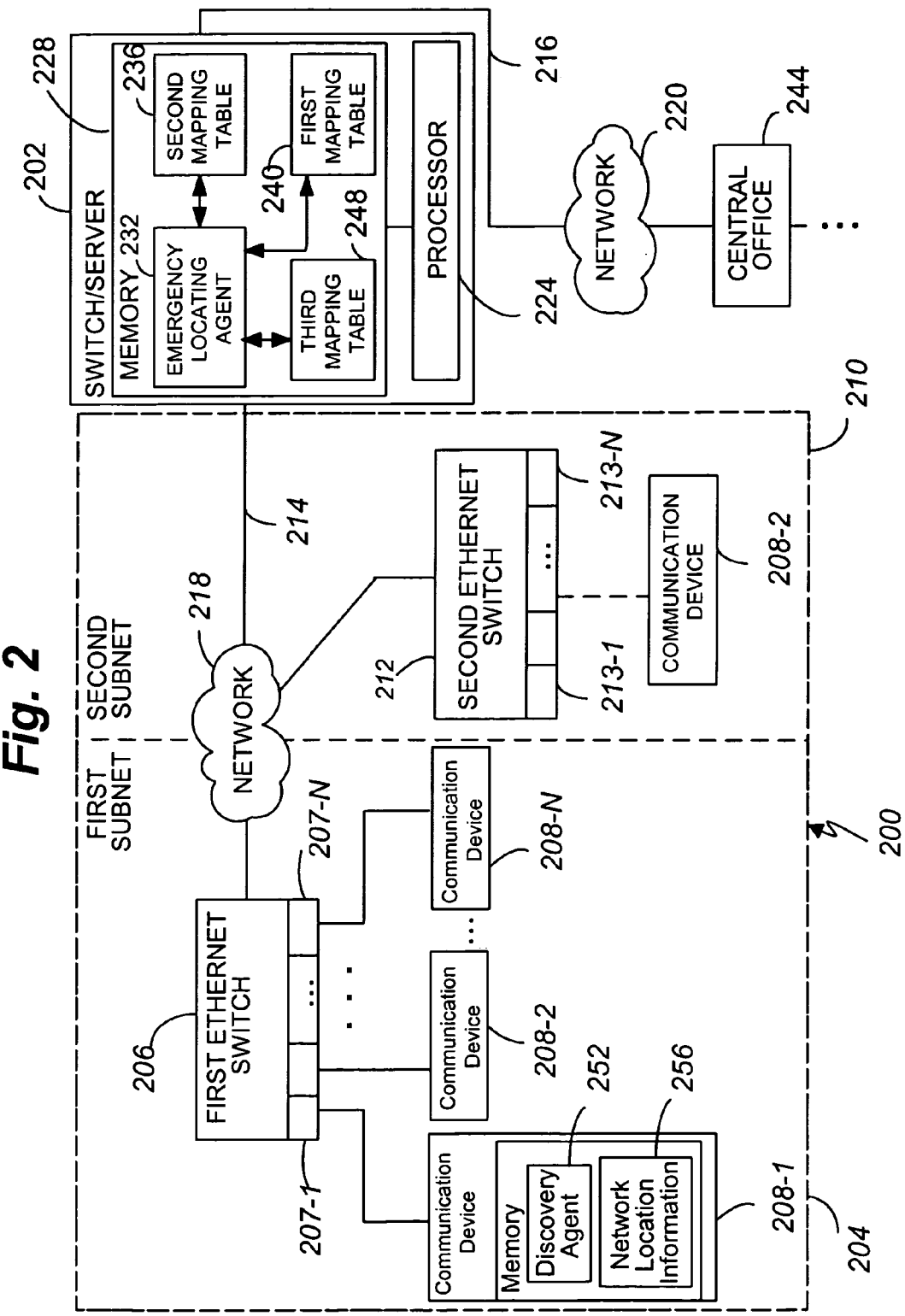
FIG. 2 is a block diagram of an emergency locating infrastructure according to an embodiment of the present invention.

FIG. 2 shows an exemplary communication system 200 in which the invention is implemented. The system 200 includes a switch/server 202 which serves a first subnet 204 and second subnet 210. Each subnet comprises a number of (Ethernet) switches 206 and 212, respectively. Each switch 206 and 212 is connected (via ports 207-1 to 207-N for switch 206 and ports 213-a to 213-N for switch 212) to and serves a number of communication devices (such as communication devices 208-1, 208-2, ... 208-N for switch 206) that are registered with the switch/server 202. "Registration" is a process by which a communication device is made known to a switch/server. As will be appreciated, the registration can be performed by any technique or according to any protocol (e.g., such as H.323, SIP, 802.11, digital port initialization, and the like) and may by effected by the system administrator and/or through another suitable manual or automated technique. Each of the communication devices may be wired desktop telephone terminals or any other type of wired or wireless device capable of communicating with the switch/server. The word "communication device" as used herein should therefore be understood to include not only wired or wireless desktop telephone terminals but also other types of processor-based communication devices, including without limitation mobile telephones, IP telephones, IP softphones, IP hardphones, personal computers, personal digital assistants (PDAs), TTY Teletype, etc.

The terms "switch" or "server" or "switch/server" as used herein should be understood to include a PBX, an enterprise switch, or other type of telecommunications system switch, as well as other types of processor-based communication control devices such as servers, computers, adjuncts, etc. By way of example, the switch/server in the exemplary embodiment may be implemented as an otherwise conventional DEFINITY™ or MULTIVANTAGE™ Enterprise Communication Service (ECS) communication system or Avaya Communication Manager™ switch available from Avaya Inc. Other types of known switches/servers are well known in the art and therefore not described in detail herein.

The switch/server is coupled via one or more communication lines 214 and 216 to networks 218 and 220, respectively. In one configuration, the communication line 214 and network 218 are packet-switched while the communication line 216 is a circuit-switched trunk line and the network 220 is the public switched telephone network (PSTN). Network 214, in one configuration, is a data or distributed processing network, such as the Internet and applies the TCP/IP suite of protocols. The lines carry incoming and outgoing contacts from the networks to the switch/server for processing. Preferably, the networks or other transit networks between the user's communication device and the switch/server and between the central office and the switch/server are configured such that the switch receives not only the intended destination address but also the source address or identity of the communication device initiating the contact. In one configuration, the communication medium 216 a Centralized Automatic Message Accounting (CAMA) or Integrated Services Digital Network (ISDN) trunk.

It should be noted that the invention does not require any particular type of information transport medium between the switch/server and the communication devices, i.e., the invention may be implemented with any desired type of transport medium as well as combinations of different types of transport media and with any desired type of network connection.

The switch/server 202 is in communication via network 220 with a central office 244. The central office 244 routes calls to a universal emergency number to a switch (not shown), which in turn routes the call to the appropriate Public Safety Answer Point (PSAP) (not shown), where the call is answered. The Emergency Location Information Number (ELIN) is sent by conventional techniques with the emergency call over the communication medium 216, such as via CAMA or via ISDN as the calling number information element. A suitably configured module (not shown) at the PSAP uses the ELIN to lookup the caller's documented street address location from the Automatic Location Information (ALI) database (not shown).

It should be emphasized that the configuration of the switch/server, communication devices, and other elements as shown in FIG. 2 is for purposes of illustration only and should not be construed as limiting the invention to any particular arrangement of elements.

The switch/server includes a processor 224 and a memory 228. The processor may be implemented as a central processing unit (CPU), microprocessor, application-specific integrated circuit (ASIC) or other type of digital data processor as well as various portions or combinations of such elements. The memory may be a random access memory (RAM), a read-only memory (ROM), or combinations of these and other types of electronic memory devices.

The processor operating in conjunction with the memory executes one or more software programs depicted in FIG. 2 as the emergency locating agent 232 and accesses various data structures in memory and/or an associated (separate) database depicted in FIG. 2 for purposes of simplicity as the first, second, and third mapping tables 240, 236, and 248, respectively, in memory 228. When a call to a universal emergency number is received from a registered communication device, the emergency locating agent 232 accesses ELIN information and determines, for the calling communication device, the appropriate ELIN (possibly in place of the actual calling party number) to forward to the central office. As discussed in detail below, the first mapping table 240 contains, for each extension, a corresponding MAC address; the second mapping table 236 contains contains pre-assigned ELINs for each hostname/port pairing. To allow public safety personnel to call back a caller who has hung up, calls to the ELIN will be automatically forwarded within a pre-designated time interval to the caller's extension.

The term "table" should be understood to include any ordered set of information or data stored in memory or other storage device accessible to the switch. The invention does not require that the information be stored in any particular length or format, e.g., a tabular format, a closed- or open-set, or location and numerous suitable storage formats and storage locations will be readily apparent to those skilled in the art.

The switch/server may include additional elements that are omitted from FIG. 2 for simplicity and clarity of illustration. For example, the switch/server may include an external database to store system configuration information, service circuits such as tone generators, announcement circuits, etc., and a port card for each type of user communication device associated therewith. Also associated with the switch/server may be an administrator terminal (not shown) which is used to program the operation of the switch/server during system administration, e.g., an initial set-up and configuration of the system of a subsequent system-level or user-level configuration. Other devices not shown in the figures may be associated with the switch/server, such as an adjunct feature server. Such an adjunct server may be physically incorporated within the switch/server and may be partially or completely implemented using other switch/server elements such as the processor 224 and memory 228.

The communication devices 208-1 through 208-N each include a discovery agent 252 and network location information 256. The network location information 256 includes typically the MAC address of the communication device, the hostname or other identifier of the Ethernet switch 206 and optionally the port number or other identifier to which the communication device is connected. As discussed in detail below, the discovery agent 252, upon the occurrence of a query initiation event, obtains, from the Ethernet switch 206 to which it is connected, the host device's corresponding network location information.

The First Mapping Table

Figures 4, 5, 6:
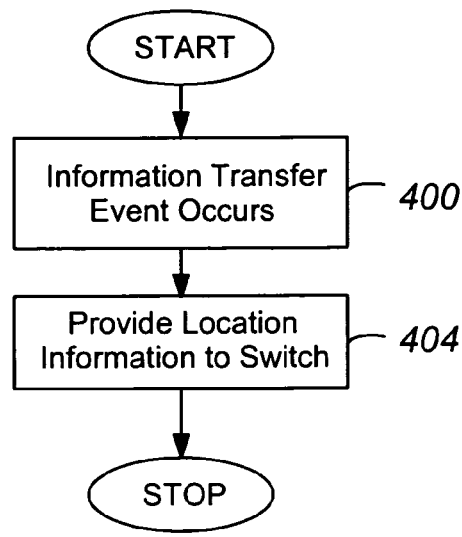
FIG. 4 is a flow chart of the operation of the discovery agent according to another embodiment of the present invention.
FIG. 5 is a format of a first mapping table according to an embodiment of the present invention.
FIG. 6 is a format of a second mapping table according to an embodiment of the present invention.

Referring to FIG. 5, the first mapping table 240 is an auto- or manual-entry table with a mapping of extension 500 to MAC address 504 for the various communication devices 208-1 to 208-N in the enterprise network. As will be appreciated, each packet-switched communication device will have a corresponding pairing of extension number and MAC address.

The Second Mapping Table

Referring now to FIG. 6, the second mapping table includes the following fields: a field 600 providing the hostname or other identifier of each Ethernet switch in the enterprise network, a field 604 providing each port number or other identifier for each port on an identified Ethernet switch; an optional field 608 providing, for each port and Ethernet switch pairing, physical location information identifying the physical location of the geographical area served by the pairing; and a field 612 providing, for each port and Ethernet switch pairing, a corresponding ELIN. Once completed, neither the administrator nor the switch/server will typically modify the second mapping table unless the physical location is rewired.

The ELIN can be configured in different ways. The ELIN is not limited to extensions on the local switch/server. As will be appreciated, the ELIN may correspond not only to a real (physical) phone but also a virtual phone. The ELIN may be for a different communication device than the particular device placing an emergency call. Generally, the ELIN is selected such that the physical location of the ELIN does not change and the ELIN's physical location is close to the physical locations of the Ethernet switch/port pairings served by the ELIN. For example, if a selected Ethernet switch/port pairing has a physical location nearby extension 1111, the ELIN for the pairing could be extension 1111.

The physical area served by the ELIN is referred to as the emergency response location. For circuit switched telephones, the emergency response location is typically a relatively small area, such as a desktop. For packet switched networks such as IP networks, the emergency response location is typically one subnetwork, though an ELIN can be selected to serve only a portion of a subnetwork depending upon the desired degree of location precision. The required maximum size of the emergency response location may be defined by state or local law. The National Emergency Number Association recommends that the emergency response location be somewhere between 7,000 and 40,000 square feet. Although the present invention is described with reference to subnetworks or subnets, the emergency response location may be defined as a smaller area depending on the application.

The ELIN is not required to be an extension on switch/server 202. For example, if an enterprise network includes several switches/servers co-located or if a user travels cross-country, the ELIN administered into the table can be an extension supported by a different switch/server.

The Third Mapping Table

Referring to FIG. 8, the third mapping table 248 contains, for each device identifier (which is typically MAC address)

808, a field 800 containing the identity of a corresponding Ethernet switch to which the communication device having the MAC address is connected and a field 804 containing the port identifier of the port on the corresponding Ethernet switch to which the device is connected.

The Operation of the Discovery Agent

Figure 3:
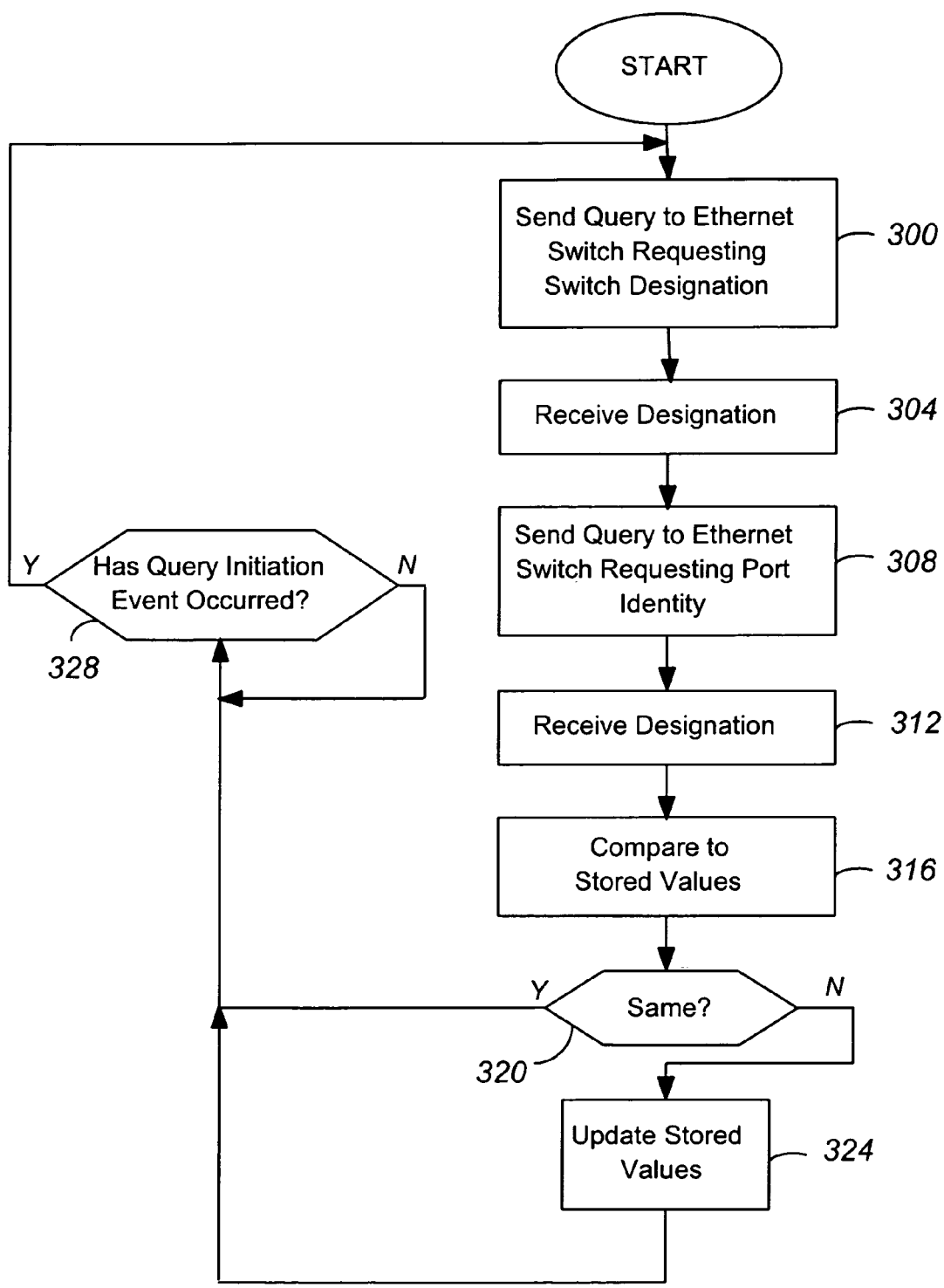
FIG. 3 is a flow chart of the operation of the discovery agent according to an embodiment of the present invention.

FIG. 3 depicts the operation of the discovery agent 252 according to an embodiment of the present invention. Although not depicted, the steps described herein can apply to proprietary digital protocol enabled telephones.

Upon the occurrence of a query initiation event, the discovery agent 252, in step 300, sends a query to the Ethernet switch to which it is connected requesting the switch designation. The query initiation event can be any suitable event upon which to trigger the query sequence so that the network location information obtained by the communication device is current and accurate. For example, the event can be the placement of a contact from the host communication device, the initial connection of the host communication device to a port of the switch, the powering up of the host communication device after a period during which the device is without power, the re-establishment of a link between the host communication device and the Ethernet switch, the passage of a specified time period, and combinations thereof. The switch designation refers to a unique identifier of the Ethernet switch, typically an IP address and/or a hostname.

The designation is received by the discovery agent 252 in step 304.

In step 308, the discovery agent 252 sends a second query to the Ethernet switch to determine the identity of the port to which the host communication device is connected. The Ethernet switch maintains a table indexing port number to the MAC address of the device to which the port is connected. The Ethernet switch maps the MAC address in the query received from the discovery agent against the port number to identify the port number to which the host device is connected.

In step 312, the discovery agent 252 receives the port number from the Ethernet switch.

In step 316, the Ethernet switch compares the currently received switch identifier and port number (or network location information) against the currently stored values for these variables and, in decision diamond 320, determines if the stored values for the network location match the current values for the network location. If not, the discovery agent 252, in step 324, updates the non-identical stored value(s) using the most currently received value(s). If so or after updating the stored value(s), the discovery agent 252 proceeds to decision diamond 328.

As will be appreciated, network location information can be the switch identifier alone. In some applications, port number may be unnecessary to obtain the necessary caller location accuracy and therefore may unnecessarily consume processing resources. The Ethernet switch identifier alone could provide the location of the subnet serviced by the Ethernet switch. For example, knowing the Ethernet switch alone may permit the location of the caller to be narrowed down to the fourth floor, west wing of a building while knowing the Ethernet switch port number to which the calling device is connected would provide the office number of the caller on the west wing of the building.

In decision diamond 328, the discovery agent awaits the next occurrence of a query initiation event.

The query and response messages can be configured according to any suitable protocol, such as the Simple Network Management Protocol or SNMP, proprietary protocols such as the Cisco Discovery Protocol (CDP), and the like. In one configuration, the signal exchange is configured according to the IEEE Link Layer Discovery Protocol or LLDP (or IEEE 802.1AB). As will be appreciated, in an exchange defined by the LLDP the Ethernet switch would identify itself to the communication device, and the communication device would identify itself to the Ethernet switch. LLDP is not a query/response sequence but a "voluntary" exchange of information between directly connected devices. Because LLDP is applicable at the port level, it can be much easier to transfer port information via LLDP than via a query/response protocol, such as SNMP.

FIG. 4 depicts another operational configuration of the discovery agent 252. In this configuration, the discovery agent 252 transfers the stored network location information to the switch/server 202.

The transfer of network location information from the communication device to the emergency locating agent 232 in the switch/server 202 is effected upon the occurrence of an information transfer event in step 400. The information transfer event can be any suitable event upon which to trigger the transfer and is selected to occur after the query initiation event. The information transfer event can be the placement of a contact to any location from the host communication device, the placement of a call to a universal emergency number, the passage of a specified time period, the registration or attempted registration of a communication device, and combinations thereof.

After the occurrence of the information transfer event, the discovery agent, in step 404, provides the network location information and the host device's MAC address to the emergency locating agent 232. The information can be embedded in messages specified by existing protocols or be included in new messages not currently specified by an existing protocol. In the H.323/H.225 protocols for example, the network location information can be embedded in a call signaling message, a Registration Admission Status or RAS message, a keep alive message, and combinations thereof. In the Session Initiation Protocol or SIP, the network location information can be embedded in an Invite message, a register message, and/or an Okay message.

The emergency locating agent 232 stores the Ethernet switch and port identifiers in the third mapping table 248 under the host device's MAC address.

Operation of Emergency Locating Agent

The operation of the emergency locating agent 232 will now be described with reference to FIG. 7.

In step 700, the switch/server 202 receives a signal associated with an outgoing contact directed to a universal emergency number. The signal includes the extension of the contacting communication device.

In response, the agent 232 in step 704 maps the extension against the first mapping table 240 to determine the contacting device's MAC address. As used herein, "mapping" refers to any process used to determine a variable(s) based on another variable.

In step 708, the agent 232 retrieves the third mapping table 248.

In step 712, the agent 232, maps the MAC address against the third mapping table 248 to determine the network location information corresponding to the MAC address of the contacting device.

In step 716, the agent 232 maps the network location information (e.g., hostname and/or port number) against the second mapping table 236 to determine the ELIN to forward to the central office 244.

In step 720, the switch/server 202 forwards the ELIN to the central office 244 to initiate the emergency call.

Wireless Network Implementation

In another configuration, ELIN's are selected for a wireless communication device serviced by a wireless network, such as a wireless Local Area Network or WLAN. Currently, for communication devices connected through a packet-switched network the physical location of the contactor corresponding to the IP address of the communication device is manually configured in the ELIN or in another controller of the network. When a universal emergency number is contacted from a wireless communication device (such as a wireless IP hard- or softphone), the device itself does not know where the it is located physically and therefore is unable to provide physical location information. In SIP, the signals along the communication path between the device and a SIP proxy, which interfaces with the PSTN, are encrypted. The switches along the path, therefore, are unable to specify the location of the wireless communication device.

Figure 9:
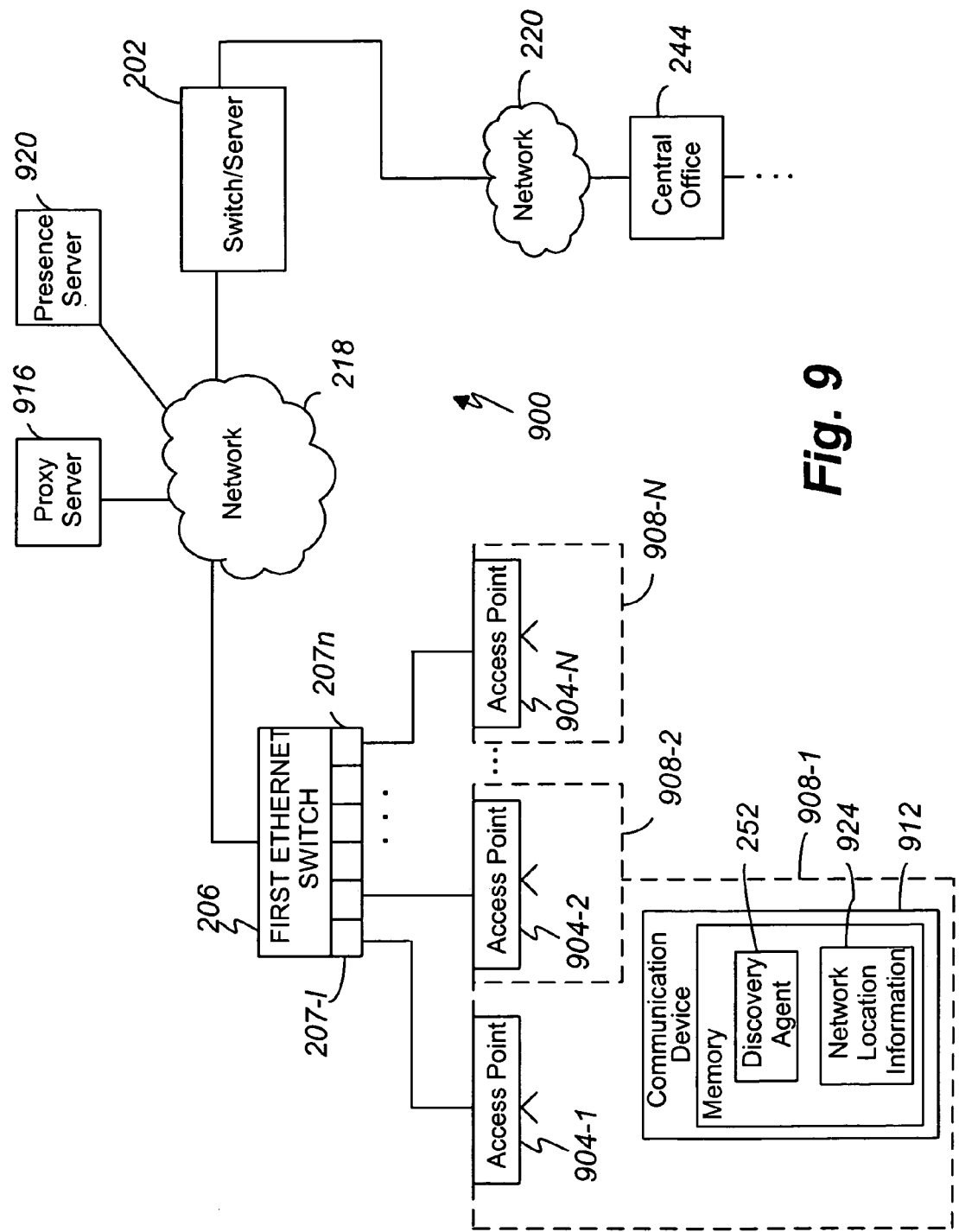
FIG. 9 is a block diagram of an emergency locating infrastructure according to an embodiment of the present invention.

FIG. 9 provides an implementation that addresses this problem. Although FIG. 9 is discussed with reference to a WLAN, it is to be appreciated that the principles of the present invention apply equally to a wireless Wide Area Network with base stations being substituted for the wireless access points.

The communication system 900 comprises a plurality of wireless access points 904-1 through 904-N, each of which is connected to a corresponding port 207-1 through 207-N of the Ethernet switch 206. As will appreciated, wireless access points can be located remotely from the wired access points, thereby acting as extended service sets or as a bridge between multiple LANs and/or WLANs. Such wireless access points communicate with the wired access points using wireless techniques. The access points can be any suitable device for communicating wirelessly with a communication device. Access points typically include an (dual diversity) antenna, a transceiver, a modem, and signal processing electronics.

Each access point 904 has a radio frequency or RF footprint that encompasses a corresponding geographical region 908-1 through 908-N (or a basic service set). A geographical region may, for example, be a single floor of a large building or a portion thereof. Communication devices within a given geographical region or basic service set communicate wirelessly with the servicing access point 904 as in the case of communication device 912, which is in the region 908-1 and communicates with access point 904-1. As will be appreciated, wireless communication devices communicate wirelessly with each other via the wired network 218 using the access point as a bridge to relay the communications. Communications within each WLAN can be governed by any suitable protocol, such as 802.11, 802.11a, 802.11b, HiperLAN, or HiperLAN II. The 802.11 protocols deal with interference from other radio frequency sources using either direct sequence spread spectrum (DSSS) or another type of spread spectrum called frequency hopping spread spectrum (FHSS).

Wireless communications are converted into wired communications by each (wired) access point 904 and conveyed through the Ethernet switch 206 to the packet-switched network 218. The communications can be directed to the proxy server 916, a presence server 920, and/of to the switch/server 202 and ultimately, via the circuit-switched network 220 (or PSTN) to the central office 244 as discussed above.

The proxy server 916 is a device that acts as a transcoder, auto-responder, and forwarding agent.

The presence server 920 collects published presence information about a communication device and/or user thereof and stores the collected information in a presence information database. The presence server typically retrieves presence information by querying against the user's identity as opposed to the device address. The presence server 920 provides the collected information to other network entities in response to queries. The presence server 920 can collect only information respecting the user's interaction with the various entities of FIG. 9 and/or other information provided directly or indirectly by the user when those entities publish their presence information to the presence server. The presence server 920 can interact with additional presence services (now shown) that continually collect and redistribute availability data from publishing sources authorized by the user.

Although not shown, the network 218 can include other components, such as registrars (which maintain a map of what IP address a given user is currently at) and redirect servers (which perform a subset of forwarding functions).

Before further describing the implementation, it is helpful to understand the various types of messages in SIP. SIP includes a REGISTER message to register a contact address for a user with the presence server 920, a SUBSCRIBE message to obtain presence information from a presence server 920 regarding a subscriber, an INVITE message to initiate the setup of a session, and an OKAY message to respond to the INVITE message. The INVITE message contains the codec, address, and listening port number of the contactor, and the OKAY message the codec, address, and listening port of the contactee. The additional details of the INVITE and OKAY messages are set forth in the Session Description Protocol or SDP. In the registration process, a REGISTER message containing a contact address (e.g., the electronic address of the communication device) is received by the presence server 920. The presence server 920 accepts the address and responds with an OKAY message. In the event that a new contact arrives for the user, the presence server 920 returns the registered address to the querying network component.

To provide a meaningful ELIN to the PSAP, one of the elements of the network 218, such as proxy server 916, presence server 920, registrar (not shown) or redirect server (not shown), or the switch/server 202, periodically notifies each of the wireless communication devices serviced in each basic service set 908 (or the corresponding enterprise switch/server 202), of the location of the access point 904 currently servicing the wireless communication device 912. The location of the access point 904 is determined by the address contained in the REGISTER message received from each wireless communication device. As will be appreciated, the REGISTER message includes the identification of the access point 904 wirelessly receiving the REGISTER message. The notifications are typically performed by the presence server 920 and can be performed at periodic time intervals and/or upon receipt of the REGISTER message. Because the notifications are generally based upon passage of time or upon receipt of a REGISTER message, the notifications are typically provided without relation to whether a contact was initiated by the wireless communication device (or independent of any contact initiated by the wireless communication device). The identification of the access point (which can be for example MAC address or another identifier) is typically stored as network location information 924 in the respective wireless communication device.

When a contact to a universal emergency number is initiated, the wireless communication device 912 attaches the identification of the access point 904-1 in the INVITE message. When the servicing switch/server 202 receives the INVITE message, the emergency locating agent 232 maps the access point identifier to a corresponding ELIN (servicing the WLAN associated with the access point) and forwards the ELIN to the central office via the network 220.

Alternatively, the switch/server 202 is notified of the servicing access point identifier and stores the identification under the extension or MAC address of the serviced wireless communication device 912. When the contact to the universal emergency number is received by the switch/server 202, the emergency locating agent 232 retrieves the currently stored identity of the wireless access point and maps it to the corresponding ELIN. This is typically performed by mapping the extension of the communication device to determine the contacting device's MAC address, retrieving the access point identifier using the MAC address, and mapping the access point identifier to determine the corresponding ELIN. The ELIN is then forwarded to the central office.

A number of variations and modifications of the invention can be used. It would be possible to provide for some features of the invention without providing others.

For example in one alternative embodiment, the agent noted above is implemented by a logic circuit, such as an ASIC, or by a combination of software and a logic circuit.

In another alternative embodiment, the communication protocols used by the various communication media 214, 216, 218, and 220 can be any suitable protocol. Examples include proprietary digital, Asynchronous Transfer Mode, Integrated Services Digital Network Primary Rate Interface (ISDN PRI), Integrated Services Digital Network Basic Rate Interface (ISDN BRI), H.323, and SIP.

In another alternative embodiment, the first, second and/or third mapping tables can use device identifiers other than MAC address, such as serial numbers, IP addresses, and the like.

In yet another alternative embodiment, a MAC address corresponds to more than one ELIN. This is particularly useful where a signaling protocol can signal multiple ELINs.

In yet another alternative embodiment, the communication device is connected both to a port of the Layer 2 switch and the wireless access point. In this embodiment, the communication device can use the access point identifier or switch/port identifier(s) alone or together for locating the communication device.

In yet another embodiment, the communication device can be connected to directly to the wireless access point and not the Layer 2 switch but uses the switch and/or port identifier(s) (to which the access point is connected) for locating the communication device.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for providing emergency location information to an emergency service provider, comprising:
    providing an enterprise network comprising:
        a wireless access point;
        a wireless communication device in communication with the wireless access point;
        an Open Systems Interconnect (OSI) switch in communication with the wireless access point;
        an enterprise switch;
        wherein the enterprise network corresponds to a plurality of Emergency Location Information Numbers (ELINs) associated with differing segments of the enterprise network, and wherein the OSI switch serves at least one of the differing segments;
    when a predetermined first event occurs, the wireless access point obtaining a wireless access point identifier and an electronic address of the wireless communication device serviced by the wireless access point; and
    when at least one of the predetermined first event and a predetermined second event occurs, the enterprise switch obtaining at least one of the wireless access point identifier and a wireless communication device unique identifier, wherein the first and second events are unrelated to the initiation of a contact to a universal emergency number.

2. The method of claim 1, wherein the at least one of the predetermined first and second events is the predetermined first event.

3. The method of claim 1, wherein the predetermined first event is one or more of registration of the wireless communication device, attempted registration of the wireless communication device, and the passage of a selected period of time.

4. The method of claim 1, wherein the predetermined first event is independent of a contact initiated by the wireless communication device to another communication device.

5. The method of claim 1, wherein the at least one of the predetermined first event and predetermined second event is the predetermined second event and wherein the predetermined second event is at least one of registration of the wireless communication device, attempted registration of the wireless communication device, and the passage of a selected period of time.

6. The method of claim 1, wherein the predetermined first and second events are different and wherein the first event precedes the second event.

7. The method of claim 1, wherein, in the enterprise switch, obtaining the wireless access point identifier is included in one or more of a call signaling message, a Registration Admission Status message, a keep alive message, a register message, and an OKAY message.

8. The method of claim 1, further comprising:
the enterprise switch receiving from the wireless communication device a contact to a universal emergency number and an extension of the wireless communication device;
based on the extension, the enterprise switch determining a Media Access Control (MAC) address corresponding to the wireless communication device;
based on the MAC address, the enterprise switch determining the wireless access point identifier;
based on the wireless access point identifier, the enterprise switch determining an ELIN corresponding to the corresponding wireless access point identifier; and
the switch forwarding the identified ELIN to a public safety answering point.

9. A computer readable medium containing instructions to perform the steps of claim 1.

10. A logic circuit configured to perform the steps of claim 1.

11. The method of claim 1, wherein the wireless access point forwards the wireless access point identifier to the wireless communication device and wherein the wireless communication device forwards the access point identifier to the switch.

12. The method of claim 11, further comprising:
the enterprise switch receiving, from the wireless communication device, an outgoing contact to a universal number, the contact including the electronic address of the wireless communication device;
based on the electronic address, the enterprise switch determining the wireless access point identifier;
based on the access point identifier, the enterprise switch determining an ELIN for the wireless communication device; and
the enterprise switch forwarding the ELM to a public safety access point.

13. The method of claim 1, wherein the wireless access point identifier is the Media Access Control or MAC address of the wireless access point.

14. An enterprise network comprising:
an Open Systems Interconnect (OSI) switch, where the enterprise network comprises a plurality of Emergency Location Information Numbers ELINs corresponding to differing segments of the enterprise network, and wherein the OSI switch serves at least one of the differing segments;
a wireless access point in communication with the OSI switch and an enterprise switch;
a wireless communication device in communication with the wireless access point, the wireless communication device comprising:
a discovery agent operable, when a predetermined first event occurs, to obtain from the wireless access point a wireless access point identifier; and
the enterprise switch, when at least one of the predetermined first event and a predetermined second event occurs, operable to obtain the wireless access point identifier and maintain a set of data structures mapping the wireless access point identifier to an ELIN corresponding to a network segment comprising the wireless communication device.

15. The device of claim 14, wherein the at least one of the predetermined first and second events is the predetermined first event.

16. The device of claim 14, wherein the predetermined first event is one or more of registration of the wireless communication device, attempted registration of the wireless communication device, and the passage of a selected period of time.

17. The device of claim 14, wherein the predetermined first event is independent of a contact initiated by the wireless communication device to another communication device.

18. The device of claim 14, wherein the at least one of the predetermined first event and a predetermined second event is the predetermined second event and wherein the predetermined second event is at least one of registration of the wireless communication device, attempted registration of the wireless communication device, and the passage of a selected period of time.

19. The device of claim 14, wherein the predetermined first and second events are different and wherein the first event precedes the second event.

20. The device of claim 14, wherein the wireless access point identifier is included in one or more of a call signaling message, a Registration Admission Status message, a keep alive message, a register message, and an OKAY message addressed to the enterprise switch.

21. The device of claim 14, wherein, when a contact to a universal emergency number is received from the wireless communication device, the enterprise switch is operable to determine a Media Access Control (MAC) address corresponding to the wireless communication device; based on the MAC address determine the corresponding access point identifier; based on the wireless access point identifier determine an ELIN corresponding to the corresponding access point identifier; and forward the identified ELIN to a public safety answering point.

22. In an enterprise network comprising at least one wireless communication device, an Open Systems Interconnect (OSI) switch and a corresponding enterprise switch, wherein the at least one wireless communication device is wirelessly connected to a wireless access point, the wireless access point being connected to the OSI switch, the enterprise network comprising a plurality of Emergency Location Information Numbers (ELINs) corresponding to differing segments of the enterprise network, and wherein the OSI switch serves at least one of the differing segments, a system comprising:
when a predetermined first event occurs, means for obtaining a wireless access point identifier and an electronic address of the at least one wireless communication device serviced by the wireless access point; and
when at least one of the predetermined first event and a predetermined second event occurs, means for obtaining at least one of the wireless access point identifier and a wireless communication device unique identifier, wherein the first and second events are unrelated to the initiation of a contact to a universal emergency number.

23. The device of claim 22, wherein, when at least one of the predetermined first event and a predetermined second event occurs, the enterprise switch is operable to obtain the wireless access point identifier from the wireless communication device and maintain a set of data structures mapping the wireless access point identifier to an ELIN corresponding to a network segment comprising the wireless communication device.

24. The device of claim 23, wherein the at least one of the predetermined first event and second events is the predetermined first event.

25. The device of claim 23, wherein the predetermined first and second events are different and wherein the first event precedes the second event.

26. The device of claim 22, wherein, when a contact to a universal emergency number is received from the wireless communication device, the enterprise switch is operable to determine a Media Access Control (MAC) address corresponding to the wireless communication device; based on the MAC address determine the corresponding access point identifier; based on the wireless access point identifier determine an BUN corresponding to the corresponding access point identifier; and forward the identified ELIN to a public safety answering point.

* * * * *

UNITED STATES PATENT AND TRADEMARK OFFICE
CERTIFICATE OF CORRECTION

| | | |
|---|---|---|
| PATENT NO. | : 7,974,388 B2 | Page 1 of 1 |
| APPLICATION NO. | : 11/326702 | |
| DATED | : July 5, 2011 | |
| INVENTOR(S) | : Emek Sadot | |

It is certified that error appears in the above-identified patent and that said Letters Patent is hereby corrected as shown below:

At column 15, line 46, please delete "ELM" and replace it with --ELIN-- therein.

At column 18, line 6, please delete "BUN" and replace it with --ELIN-- therein.

Signed and Sealed this
Third Day of April, 2012

David J. Kappos
*Director of the United States Patent and Trademark Office*